United States Patent [19]
Gibbon

[11] Patent Number: 5,030,820
[45] Date of Patent: Jul. 9, 1991

[54] MICROWAVE/ELECTRIC HEATABLE HAIR CURLER

[75] Inventor: Robert M. Gibbon, Fort Worth, Tex.

[73] Assignee: JMK International, Inc., Fort Worth, Tex.

[21] Appl. No.: 294,296

[22] Filed: Jan. 9, 1989

Related U.S. Application Data

[63] Continuation-in-part of Ser. No. 197,156, May 23, 1988, Pat. No. 4,952,360.

[51] Int. Cl.⁵ .......................... H05B 6/80; A45D 1/04
[52] U.S. Cl. .................. 219/10.55 R; 219/10.55 F; 219/222; 132/229; 132/233
[58] Field of Search ............... 217/10.55 R, 10.55 A, 217/10.55 E, 10.55 F, 222; 132/229, 230, 233

[56] References Cited

U.S. PATENT DOCUMENTS

| | | | |
|---|---|---|---|
| 4,499,355 | 2/1985 | Walter | 219/222 |
| 4,538,630 | 9/1985 | Henderson | 219/10.55 A |
| 4,584,462 | 4/1986 | Morrison | 219/222 |
| 4,624,271 | 11/1986 | Kin | 132/229 |
| 4,695,704 | 9/1987 | Andis | 219/222 |
| 4,710,609 | 12/1987 | Switlicki | 219/222 |
| 4,849,593 | 7/1989 | Hughes et al. | 219/10.55 R |

Primary Examiner—Philip H. Leung
Attorney, Agent, or Firm—Charles D. Gunter, Jr.

[57] ABSTRACT

A microwaveable hair curler is shown which is also electrically heatable. The microwaveable hair curler is preferably blended from a polyorganosiloxane gum, a particulate electromagnetic absorptive material, a filler and a catalyst and extruded as in a cylindrical shape. The hair curler is heatable by exposure to microwave energy in a microwave oven or can be used in a variety of commercially available electric heating units.

2 Claims, 5 Drawing Sheets

MICROWAVE/ELECTRIC HEATABLE HAIR CURLER

CROSS-REFERENCE TO RELATED APPLICATIONS

This application is a continuation-in-part of my earlier filed application, Ser. No. 197,156, filed May 23, 1988, Pat. No. 4,952,360 entitled "Microwave Heatable Curler And Method."

BACKGROUND OF THE INVENTION

1. Field of the Invention

The present invention relates to devices for drying and curling hair through the alternate use of microwave and electric heating sources and to a method for using such devices.

2. Description of the Prior Art

Hair curlers are known for use in drying and curling hair and have been provided in a variety of configurations. Generally, the prior art curlers have comprised molded cylinders or spools of microwave transmissive materials such as plastic, which were heated by steam or hot water or which had hollow cores which were fitted around electrically heated rods. Other prior art electrically heated curlers were formed as flexible, rod-like bodies which could be bent over themselves to retain a hair tress wound thereon. See, for example, U.S. Pat. No. 4,584,462, issued Apr. 22, 1986, to Morrison. The known electrically heated hair curlers required a lengthy pre-heating time before reaching operating temperatures and failed to hold heat efficiently.

Other prior art hair curlers were comprised of molded synthetic compositions which included microwave absorptive materials, such as ferrite, so that such compositions were microwave actuable. However, the known microwaveable curlers were sealed at both ends, making them unsuitable for use in the existing electric heating units. Also the known prior art designs were complicated, containing internal sleeves, heat sink materials, wicking materials, and the like.

It is an object of the present invention to provide a hair curler which is rapidly heated to operating temperatures in a microwave oven but which is also heatable in existing electrical heating units.

Another object of the invention is to provide a microwaveable hair curler which is alternately heatable by an electrical source and which has superior heat loss characteristics to the prior art electrically heated hair curlers.

Additional objects, features and advantages will be apparent in the written description which follows.

SUMMARY OF THE INVENTION

The microwave heatable hair curler of the invention has an elongate body comprised of a matrix material having blended therein an electromagnetic absorptive material. Preferably, the hair curler of the invention has a tubular curler body with an open interior, an exterior and at least one open end, said body being comprised of a matrix material having blended therein an electromagnetic absorptive material to produce a homogeneous matrix composition which is heatable by exposure to microwave energy.

In the preferred embodiment, the curler body is generally cylindrical having a preselected internal diameter which is sized to allow the curler body to be received over the upwardly extending prongs of an electrically heated hair curling apparatus. The matrix material is preferably a silicone rubber composition which has been extruded through a die and then cut to the desired length, said silicone rubber composition being blended from a polyorganosiloxane gum, a particulate, electromagnetic absorptive material, a filler and a curing catalyst to produce a homogeneous matrix composition which is heatable by exposure to microwave energy.

The curlers of the invention are heatable either by exposure to microwave energy or by actuating the electrical heating source.

DETAILED DESCRIPTION OF THE INVENTION

Figure 1:
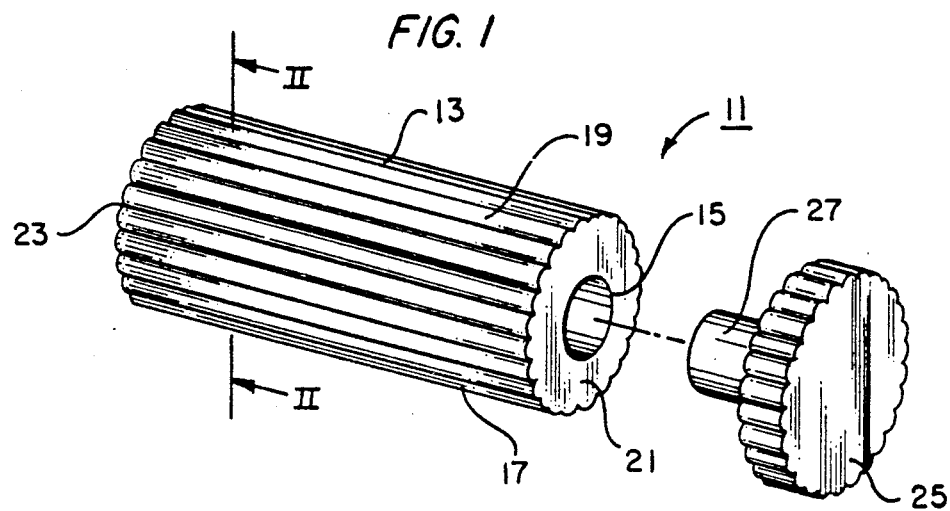
FIG. 1 is a side, perspective view of a hair curler of the invention showing the end cap removed for ease of illustration.

FIG. 1 shows a microwave heatable hair curler of the invention designated generally as 11. The hair curler 11 can have various configurations, for example an elongate, rod-like shape such as that shown in the previously mentioned U.S. Pat. No. 4,584,462, the disclosure of which is incorporated herein by reference. Preferably, the hair curler 11 includes a flexible, cylindrical curler body 13 having a length, an open interior 15 and an exterior 17 as shown in FIG. 1. The exterior 17 has a plurality of elongate ribs 19 running longitudinally for the length of the body. The ribs 19 give the periphery of the curler 11 a scalloped appearance when viewed from the end, or in the cross-sectional view of FIG. 2.

Figure 2:
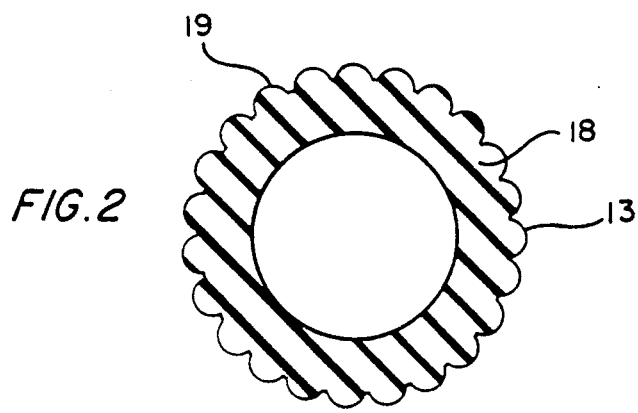
FIG. 2 is a cross-sectional view taken along lines II—II in FIG. 1.

As shown in FIG. 1 and 2, the body 13 has opposing ends 21,23, at least one of which is open. In the embodiment shown, the end 21 is provided with an end cap 25 having an outer configuration similar to that of the body 13 and having an inward projection 27 which is received within the open interior 15 of the curler body 13.

The hair curler bodies 13 of the invention are comprised of a matrix material having blended therein an electromagnetic absorptive material to produce a homogeneous matrix composition which is heatable by exposure to microwave energy. The matrix material can comprise any of a number of commercially available moldable and extrudable thermoplastic and thermosetting materials, e.g., natural rubber, synthetic rubber, styrene butadiene rubber, ethylene propylene rubber, chloroprene or nitrile rubber. Other plastic type materials such as polysulfides, urethanes and acrylic materials can be utilized. It is only necessary that the matrix material be curable to a state which is rigid enough to roll hair and that the matrix material allow the incorporation of a microwave absorptive material. Because many of the above materials contain carbon black reinforcement and suffer from long term embrittlement due to oxidation, ozone attack and general use, the preferred matrix material is a silicone rubber composition. The end cap 25 can be of any of the above listed matrix materials but does not have included therein the microwave absorptive material.

The preferred matrix material for the curler bodies 13 can be manufactured by blending together a polyorganosiloxane gum with a particulate electromagnetic absorptive material to produce a homogeneous, silicone rubber composition which is heatable by exposure microwave energy. The organopolysiloxane polymers or gums employed in the preferred matrices of the invention are well known materials and can be made by standard methods known in the art. The preferred polymer is an organopolysiloxane gum which contains methyl, vinyl, phenyl and/or 3, 3, 3-trifluropropyl radicals attached to the silicone atoms of the polymeric siloxane. Examples of organopolysiloxane gums are those polymers, copolymers and mixtures thereof wherein the siloxy units can be dimethylsiloxane, phenylmethylsiloxane, 3, 3, 3-trifluoropropylmethyl siloxane, diphenylsiloxane, methylvinylsiloxane, and phenylvinylsiloxane. A discussion of the preparation of such compounds can be found, for example, in: Eaborn, D., "Organo Silicone Compounds", Academic Press, New York, 1959; Montermoso J. C., "Silicone Rubbers", Morton, E. D., "Introduction to Rubber Technology", Reinhold Publishing Corp., New York, 1959; Rochow, E. G., "An Introduction to the Chemistry of Silicones", to Ed. John Wiley and Sons, New York, 1951.

The organopolysiloxane polymer used in the method of the invention is most preferably a dimethyvinylsiloxyended polydiorganosiloxane having a percentage of all organic radicals in the gum, 99.80 percent by weight methyl radicals and about 0.2 percent by weight vinyl radicals. A preferred polymer has a specific gravity in the range from about 1.24–1.29 and a durometer of about 40–55.

In order to provide a matrix composition which is microwave heatable, a particulate, electromagnetic absorptive material is blended with the matrix material. A number of such materials are commercially available, including ferrites, powdered iron, powdered aluminum, and zinc oxide. The preferred absorptive material is zinc oxide and when blended in the range from about 5 to 30 parts per 100 parts polyorganosioxane gum produces a silicone rubber blend which is heatable in the range of 130°–135° F. by exposure to a 700 watt microwave oven for 1 to 3 minutes.

The polyorganosiloxane gum can contain any of the conventional filler materials. These filler materials are well known in the art and are commercially available from a number of sources. The preferred material is a silica filler, sometimes referred to an reinforcing filler, or a mixture of silica filler and an extending filler. Examples of silica filler which can be utilized to reinforce the organopolysiloxane elastomer are fumed silica, precipitated silica, silica aerogel, etc. The filler material, including reinforcing and non-reinforcing fillers, is preferably used in the range of about 10–260 parts of filler per 100 parts of organopolyorganosiloxane gum or elastomer, most preferably in the range of about 20 to 80 parts of filler.

Various curing agents can be employed to effect the more rapid conversion of the polyorganosiloxane compositions to the cured, solid elastic state. For example, benzoyl peroxide, bis (2,4-dichlorobenzoyl) peroxide, and the like. These curing agents are normally present in the polyorganosiloxane composition in an amount ranging from about 0.1 to high as 4 to 8 parts or more based on 100 parts of organpolysiloxane blend.

In addition to the above described ingredients, the silicone rubber matrix compositions of the invention can contain heat stability additives, compression set additives, additives to improve handling properties, dyes or coloring additives and other additives conventionally used in heat cured silicone elastomers and also room temperature cure elastomers.

The preferred silicone rubber matrix composition is made by blending or milling together the various constituents. The order of adding the elastomer, filler, curing agent, and electromagnetic absorptive material is not critical. The following example is intended to be illustrative of the invention:

| Polyorganosiloxane Gum | 60.0 |
| Zinc Oxide* | 15.0 |
| Fume Silica | 23.0 |
| Structure Control Fluid | 2.0 |
| Pigment (Blue) | 0.6 |
| Benzoyl Peroxide Catalyst | 0.6 |

*Nodular, pure grade zinc oxide having a high surface (7 sq.m/gm.).

Approximately 100 ft. of the above compound was then extruded through a 0.500 inch O.D. die with a 0.065 I.D. pin to produce a curler body having a generally cylindrical configuration as shown in FIG. 1. The extrusion belt speed was set at 28 ft. per minute to obtain a good partial cure of the polymer. The extruded body was then cut into 2.5" lengths and the curler segments so produced were post cured at 400° F. for one hour. An end cap 25 was installed in one end 21 of each curler body and either fused by heat or by the application of a suitable adhesive.

Figure 3:
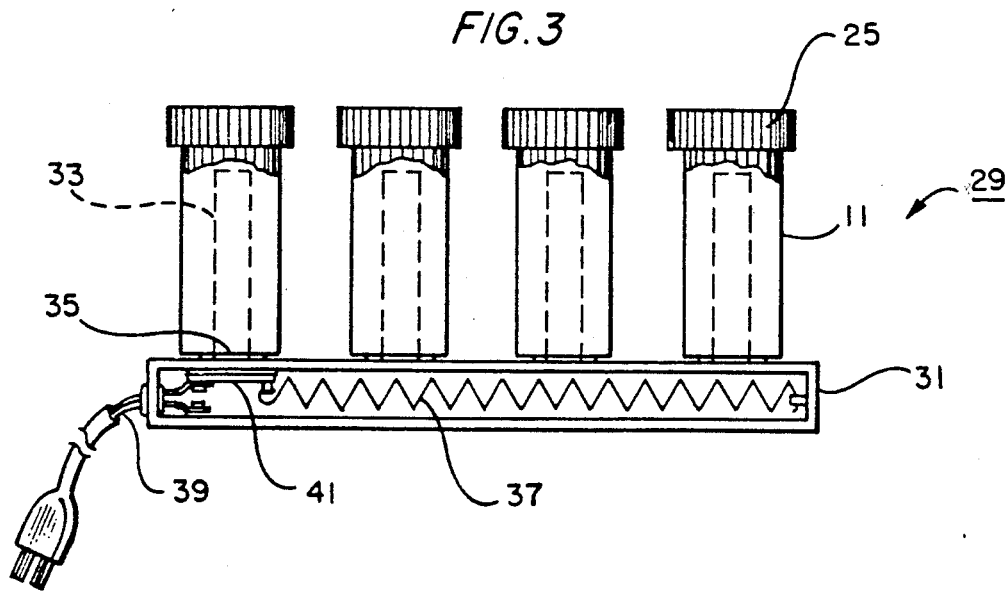
FIG. 3 is perspective view of an electrical heating apparatus having the curlers of the invention mounted thereon.

In the method of the invention, the curlers 11 are heated by either exposure to microwave energy, as in a microwave oven, or by exposure to an electrical heating source. FIG. 3 shows a known electrical heating source 29 useful for heating the tubular curlers 11 of the invention. The heating source 29 includes a non-conductive base 31 on which are mounted a plurality of upwardly extending prongs 33. The prongs 33 have one end 35 in heat-transferring connection with an electric heating element 37 located within the base 31. The electric heating element may be connected to a source of electrical current by means of a supply wire 39 and is connected in series with a thermostat 41 in heat transmitting connection with the heating element 37.

The thermostat 41 is selected to cut off the supply of electricity to the heating element 37 when at least one of the prongs 33 provided on the base has attained such temperature that the curler 11 placed on the prong has attained a predetermined temperature of about 130–135 degrees F. Electrical heating sources of the type described are shown, for instance in Re.26,766, to Jorgensen, re-issued Jan. 13, 1970 and entitled "Apparatus For Heating And Setting Hair."

It will be understood that a pouch, such as that shown in U.S. Pat. No. 4,584,462, can be used to electrically heat flexible, rod-shaped curlers which have been manufactured of a matrix material and a blended electromagnetic absorptive material according to the technique of the invention.

Figure 4:
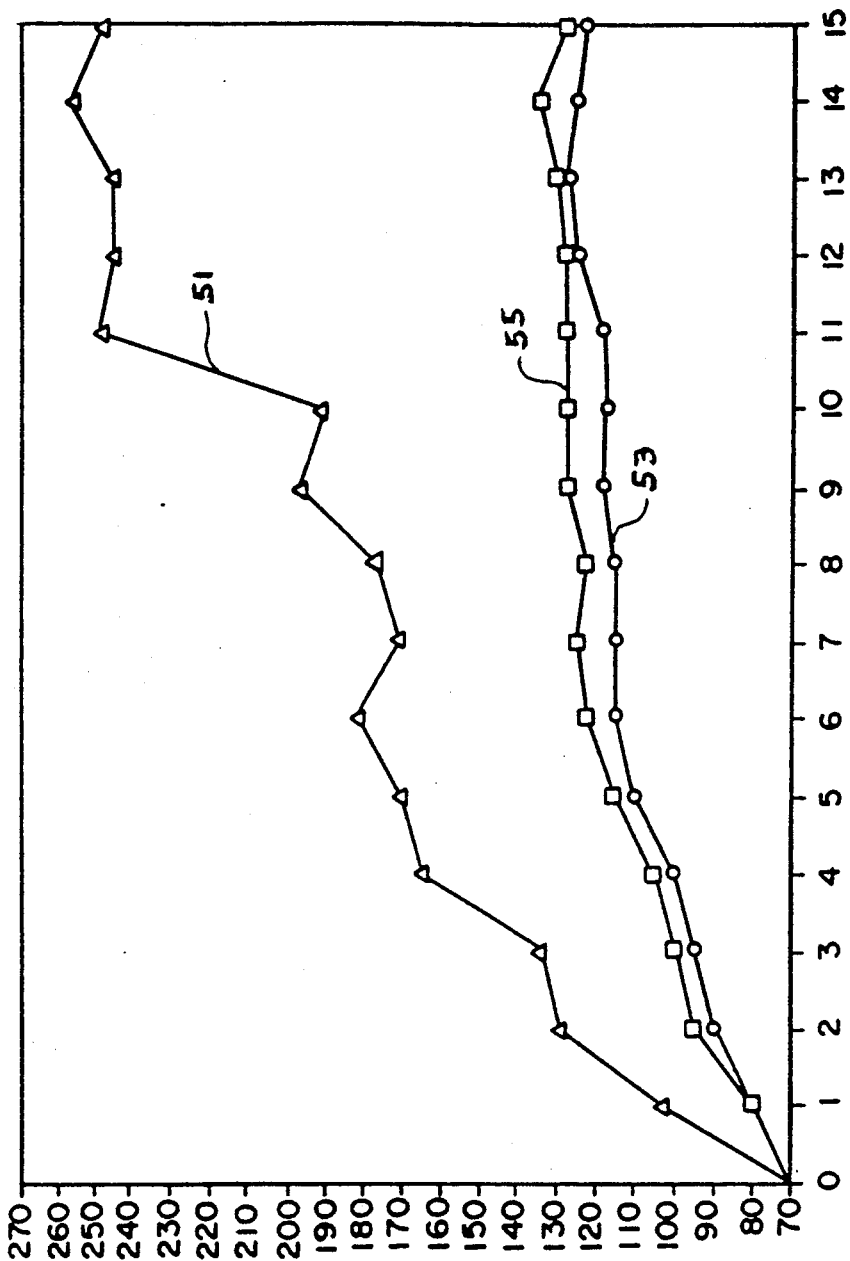
FIG. 4 a graph of temperature increase versus time comparing the curlers of the invention when heated by microwave energy to commercially available, electrically heated hair curlers.

FIG. 4 illustrates the average temperature increase of the tubular curlers 51 shown in FIG. 1 as they are heated in a 700 watt microwave oven at 100% power for 0–15 minutes. Temperature at X=0 is room temperature, 72° F.

As shown in FIG. 4, the microwaveable hair curlers of the invention 51 reach the desired, useful temperature range of 125°–135° F. in 2–3 minutes if microwave actuated. FIG. 4 also shows a comparison with commercially available electrically heated tubular curlers. The comparison curlers were heated in a specially designed heat pack according to the manufacturers directions. The "small" curlers 53 were 7 ¼" long and had an I.D. of 0.64" and an O.D. of 0.4200". The "large" curlers 55 were 7¼" long and had an I.D. of 0.64" and an O.D. of 0.5625".

The microwaveable hair curlers of the invention reached the desired useful temperature range of 125°–135° F. in 2–3 minutes when microwave actuated. In this same time interval, the comparison curlers were 25°–35° F. below the desired, useful range of 125°–135° F.

Figure 5:
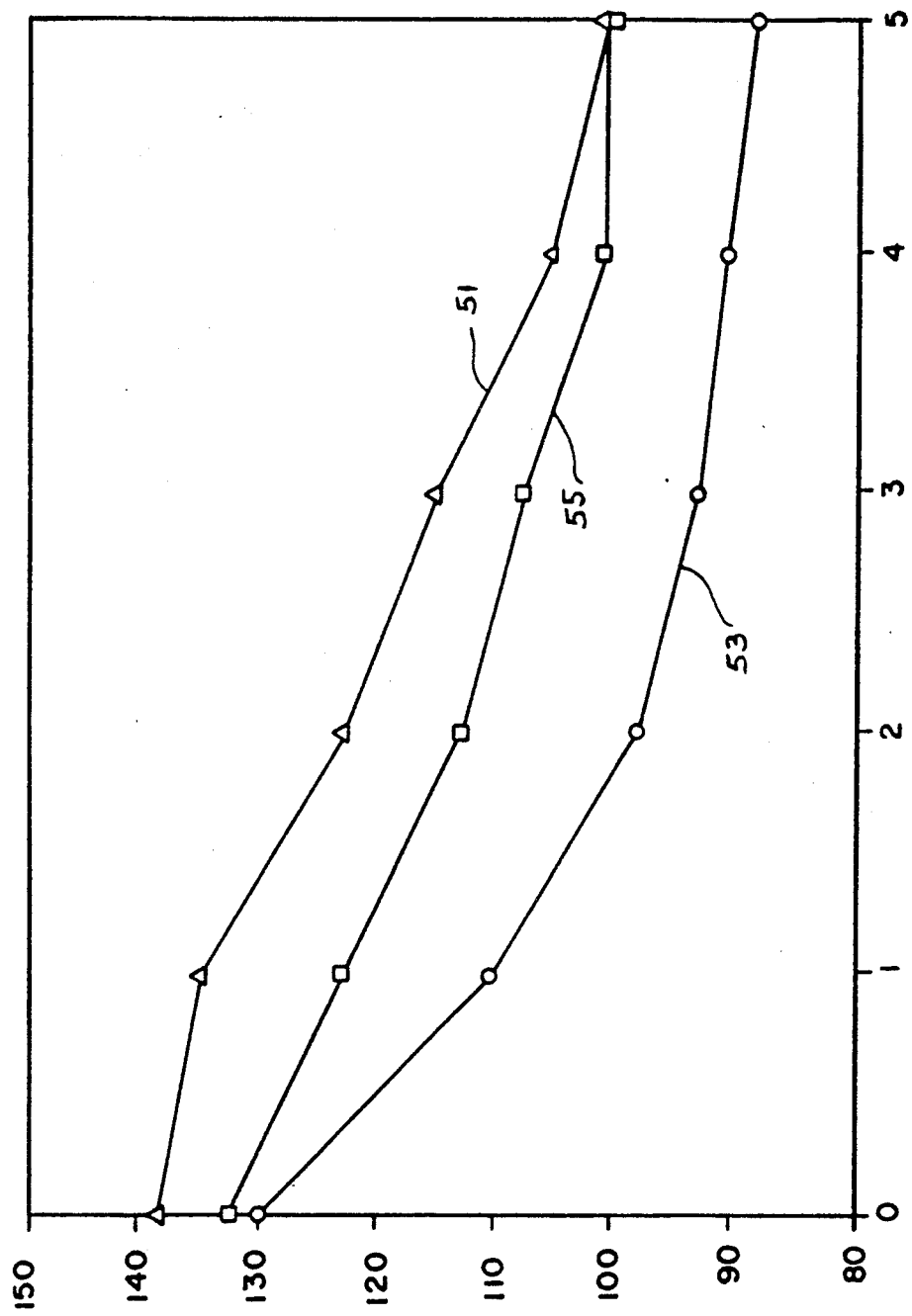
FIG. 5 is a graph of heat loss versus time comparing the curlers of the invention when heated by microwave energy to commercially available, electrically heated hair curlers.

FIG. 5 illustrates the average heat loss of the microwaveable hair curler of the invention as compared to the commercially available, electrically heated curlers. The graph depicts the average heat loss of two sets of four rollers each. The microwaveable rollers were heated for two minutes at 100% power in a 700 watt microwave oven. The comparison rollers were electrically heated. The average temperature was then taken of the rollers every ten seconds for the first two minutes and at one minute intervals for the next three minutes. The average temperature of both sets of rollers was then plotted at one minute intervals. As shown in FIG. 5, the curlers of the invention cool at an acceptable rate as compared to the commercially available, electrically heated curlers.

Figure 6:
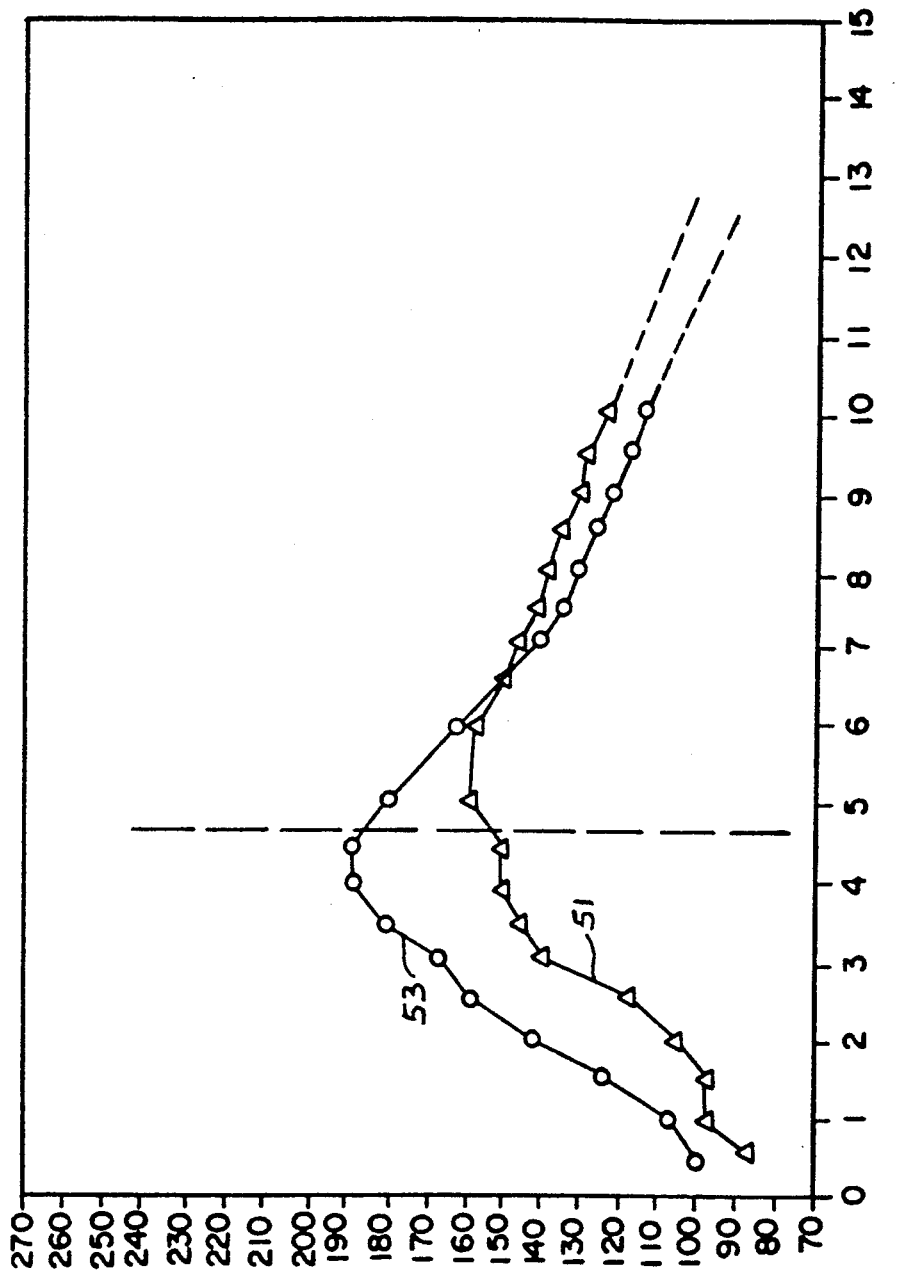
FIG. 6 is a graph of heat loss versus time which compares the electrically heated hair curlers of the invention with prior art electrically heated curlers for a warm-up cycle of approximately 5 minutes.
Figure 7:
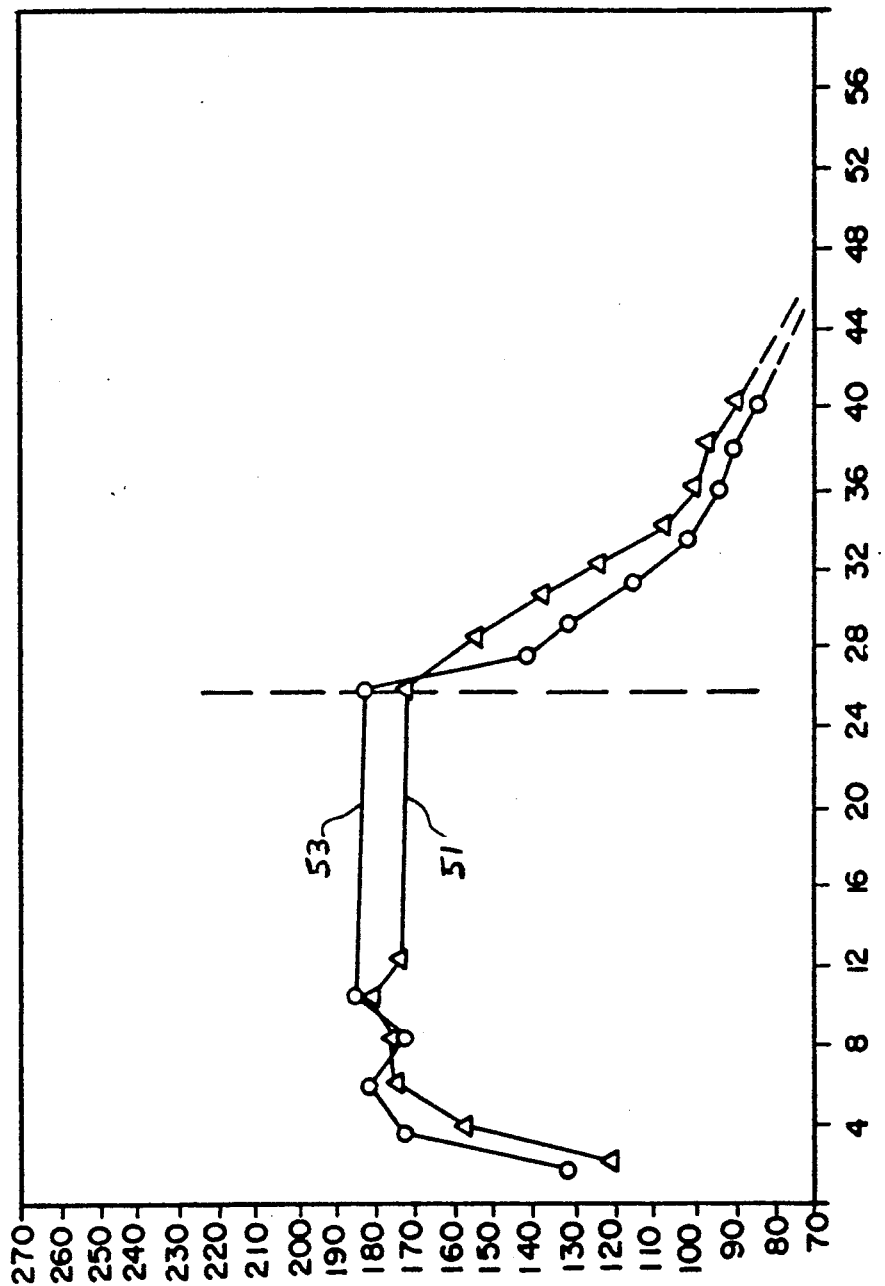
FIG. 7 is a graph similar to FIG. 6 comparing electrically heated curlers of the invention with prior art electrically heated curlers for a 26 minute warm-up cycle.

I have discovered that, in addition to offering the versatility of allowing either microwave or electric actuation, that the curlers of the invention are actually superior in heat retention characteristics to the prior art, electrically heated curlers. FIG. 6 shows that, with a 5 minute electric warm-up cycle, the curlers of the invention hold their heat longer than prior art, electrically heated curlers. FIG. 7 is similar to FIG. 6 but with the microwave heatable hair curlers heated through a warm-up cycle of approximately 26 minutes on a heating unit such as that shown in FIG. 3.

An invention has been provided with several advantages. The hair curlers of the invention can be rapidly heated to operating temperature in a standard microwave oven such as is found in the home. The hair curlers can also be electrically heated on a variety of commercially available electric heating units. The curlers retain their operating temperature for a time period which exceeds that of commercially available, electrically heated curlers, even when electrically actuated. Since the matrix material of the end cap does not contain a microwave absorptive material, the end cap remains cool to the touch after the warm-up cycle for ease of use. The hair curlers can be manufactured by a simple extrusion process utilizing an inexpensive die. The silicone rubber composition used in the manufacturing process does not degrade rapidly with time or upon exposure to sunlight, heat or chemicals.

While the invention has been shown in only one of its forms, it is not thus limited but is susceptible to various changes and modifications without departing from the spirit thereof.

I claim:

1. A microwave/electric heatable hair curling apparatus comprising:

a plurality of microwave heatable hair curlers, each of said hair curlers being formed as a tubular curler body having an open interior, an exterior and at least one open end, and wherein each of said tubular curler bodies is comprised of a matrix material having blended therein an electromagnetic absorptive material to produce a homogeneous matrix composition which is heatable by exposure to microwave energy;

an electrical heating member having a plurality of upwardly extending heating prongs mounted thereon at least one of said prongs having one of said plurality of microwave heatable hair curlers received thereon, each of said heating prongs having a conductive element which is connected to an electrical heating source for transferring heat to hair which is wound about the exterior of said tubular curler bodies, whereby said curler bodies are selectively heatable electrically and by exposure to microwave energy.

2. The microwave/electric heatable hair curling apparatus of claim 1, wherein said matrix material is a silicone rubber composition which has been extruded through a die and then cut to the desired length, said silicone rubber composition being blended from a polyorganosiloxane gum, a particulate, electromagnetic absorptive material, a filler and a curing catalyst to produce a homogeneous matrix composition which is heatable by exposure to microwave energy.

* * * * *